United States Patent
Yang

(10) Patent No.: US 11,072,304 B2
(45) Date of Patent: Jul. 27, 2021

(54) VEHICLE SEAT HAVING A REMOVABLE TRIM COVER AND INTEGRATED AIRBAG CHUTE

(71) Applicant: Lear Corporation, Southfield, MI (US)

(72) Inventor: Yong Yang, Shanghai (CN)

(73) Assignee: LEAR CORPORATION, Southfield, MI (US)

( * ) Notice: Subject to any disclaimer, the term of this patent is extended or adjusted under 35 U.S.C. 154(b) by 357 days.

(21) Appl. No.: 16/265,324

(22) Filed: Feb. 1, 2019

(65) Prior Publication Data
US 2019/0359163 A1  Nov. 28, 2019

(30) Foreign Application Priority Data

May 28, 2018 (CN) .......................... 201810520666.8

(51) Int. Cl.
| | |
|---|---|
| *B60R 21/215* | (2011.01) |
| *B60R 21/207* | (2006.01) |
| *B60N 2/60* | (2006.01) |
| *B60R 21/26* | (2011.01) |
| *B60R 21/217* | (2011.01) |
| *B60N 2/58* | (2006.01) |

(52) U.S. Cl.
CPC .......... *B60R 21/215* (2013.01); *B60N 2/6018* (2013.01); *B60R 21/207* (2013.01); *B60R 21/26* (2013.01); *B60N 2002/5808* (2013.01); *B60R 21/217* (2013.01)

(58) Field of Classification Search
CPC ..... B60R 21/207; B60R 21/215; B60R 21/26; B60R 21/217; B60N 2/58; B60N 2002/5808

USPC ........................................ 280/728.3; 297/223
See application file for complete search history.

(56) References Cited

U.S. PATENT DOCUMENTS 8,177,256 B2 * 5/2012 Smith .................. B60R 21/207
280/730.2
9,694,778 B1 * 7/2017 Veggian ............ B60R 21/23138
(Continued)

FOREIGN PATENT DOCUMENTS

DE 10238909 C1 10/2003
DE 102006014381 A1 10/2007
(Continued)

OTHER PUBLICATIONS

German Application No. 102019203691.0 Office Action dated Dec. 11, 2019, 5 pages.

*Primary Examiner* — Ruth Ilan
*Assistant Examiner* — Hilary L Johns
(74) *Attorney, Agent, or Firm* — Brooks Kushman P.C.

(57) ABSTRACT

A vehicle seat for a portion of a vehicle seat is provided. The vehicle seat includes a central base cover, a removable trim cover extending over at least a portion of the central base cover, and a side base cover secured to the central base cover. A fastener assembly has a first fastener interface secured to the removable trim cover and a second fastener interface secured to the side base cover and connected to the first fastener interface. An airbag assembly includes an inflatable airbag and an inflator disposed within an airbag chute. The airbag chute has a first end region and a second end region. The first end region is secured to the central base cover, the second fastener interface, the side base cover, and the second end region.

20 Claims, 4 Drawing Sheets

(56) References Cited

U.S. PATENT DOCUMENTS

| | | | | |
|---|---|---|---|---|
| 2002/0063452 A1* | 5/2002 | Harada | ............... | B60N 2/5825 297/216.13 |
| 2012/0110795 A1* | 5/2012 | Daijogo | ................. | D03D 1/00 24/392 |
| 2013/0093225 A1* | 4/2013 | Janowski | ............ | B60N 2/6018 297/223 |
| 2017/0072822 A1* | 3/2017 | Vijayan | ................ | B60R 21/207 |
| 2019/0210551 A1* | 7/2019 | Veggian | ............. | B60R 21/2165 |
| 2019/0225180 A1* | 7/2019 | Kondrad | ............... | B60R 21/207 |

FOREIGN PATENT DOCUMENTS

| | | | |
|---|---|---|---|
| EP | 0983895 | A2 | 3/2000 |
| EP | 0983896 | A2 | 3/2000 |

* cited by examiner

VEHICLE SEAT HAVING A REMOVABLE TRIM COVER AND INTEGRATED AIRBAG CHUTE

CROSS-REFERENCE TO RELATED APPLICATIONS

This application claims foreign priority benefits under 35 U.S.C. § 119(a)-(d) to CN 2018 105 206 66.8, filed May 28, 2018, the disclosure of which is hereby incorporated by reference in its entirety.

TECHNICAL FIELD

The present disclosure relates to a vehicle seat having a removable trim cover, and to a vehicle seat having a removable trim cover and an integrated airbag chute.

BACKGROUND

Vehicle airbag systems, which often deploy through a seam in trim materials inside the vehicle, often require a design balance between creating a seam in the trim material that is weak enough for the airbag to deploy properly, but not so weak that it fails to maintain its integrity during normal wear and tear on the trim material. This may be particularly true where the airbag system is installed in a vehicle seat, where the trim material may be stressed each time a vehicle occupant sits into or moves around in the seat.

SUMMARY

In at least one approach, a vehicle seat is provided. The vehicle seat may include a central base cover, a removable trim cover extending over at least a portion of the central base cover, and a side base cover secured to the central base cover. The vehicle seat may further include a fastener assembly having a first fastener interface secured to the removable trim cover and a second fastener interface secured to the side base cover and connected to the first fastener interface. The vehicle seat may further include an airbag assembly including an inflatable airbag and an inflator disposed within an airbag chute. The airbag chute may have a first end region and a second end region. The first end region may be secured to the central base cover, the second fastener interface, the side base cover, and the second end region.

In at least one approach, a trim assembly may be provided. The trim assembly may be provided for a vehicle seat structure that has a removable trim cover. The trim assembly may include a central base cover and a side base cover that may extend over at least a portion of the central base cover. The trim assembly may also include a fastener that may have an attachment portion. The attachment portion may extend between the central base cover and the side base cover, and may be secured to at least one of the central base cover and the side base cover. The trim assembly may also include an airbag assembly that may include an inflatable airbag and an inflator disposed within an airbag chute. The airbag chute may have a first end region and a second end region. The second end region may be disposed adjacent to, and may be secured to, the side base cover. An airbag seam may extend through the first end region, the central base cover, the attachment portion, the side base cover, and the second end region.

In at least one approach, a seating structure for a vehicle seat is provided. The seating structure may include a central base cover, a removable trim cover extending over at least a portion of the central base cover, and a side base cover secured to the central base cover. The seating structure may further include a fastener assembly having a first fastener interface secured to the removable trim cover at a first seam, and a second fastener interface secured to the central base cover at a second seam. The seating structure may further include an airbag assembly including an inflatable airbag and an inflator disposed within an airbag chute. The airbag chute may have a first end region secured to the central base cover at the second seam, and a second end region secured to the side base cover at a third seam. A fourth seam may extend through the first end region, the central base cover, the second fastener interface, the side base cover, and the second end region.

In at least one approach, a seating structure for a vehicle seat is provided. The seating structure may include a central base cover, a removable trim cover extending over at least a portion of the central base cover, and a side base cover secured to the central base cover. The seating structure may further include a fastener assembly having a first fastener interface secured to the removable trim cover at a first seam, and a second fastener interface secured to the central base cover at a second seam. The seating structure may further include an airbag assembly including an inflatable airbag and an inflator disposed within an airbag chute. The airbag chute may have a first end region and a second end region that is adjacent to the first end region and that is secured to the side base cover at a third seam. A fourth seam may extend through the first end region, the second end region, the side base cover, the second fastener interface, and the central base cover.

In at least one approach, a vehicle seat is provided. The vehicle seat may include a frame and an airbag module connected to the frame. The airbag module may include an inflatable airbag and an inflator for inflating the airbag. The vehicle seat may further include a trim cover assembly that may at least partially cover the frame and the airbag module. The trim cover assembly may include a first base cover, a removable trim cover that may extend over at least a portion of the first base cover, a second base cover that may be secured to the first base cover, a fastener assembly having a first fastener interface that may be secured to the removable trim cover and a second fastener interface that may be secured to the first base cover and removably connected to the first fastener interface. The trim cover assembly may further include an airbag chute that may receive the airbag module. The airbag chute may have an end region connected to at least one of the first base cover and the second base cover.

In at least one approach, a cushion assembly for a vehicle seat is provided. The cushion assembly may include a frame, a cushion associated with the frame, an airbag module connected to the frame, and a trim cover assembly. The airbag module may include an inflatable airbag and an inflator for inflating the airbag. The trim cover assembly may at least partially cover the frame and the airbag module. The trim cover assembly may include a first base cover, a removable trim cover extending over at least a portion of the first base cover, a second base cover secured to the first base cover, a fastener assembly having a first fastener interface secured to the removable trim cover and a second fastener interface secured to the first base cover and removably connected to the first fastener interface, and an airbag chute that receives the airbag module. The airbag chute may have an end region connected to at least one of the first base cover and the second base cover.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
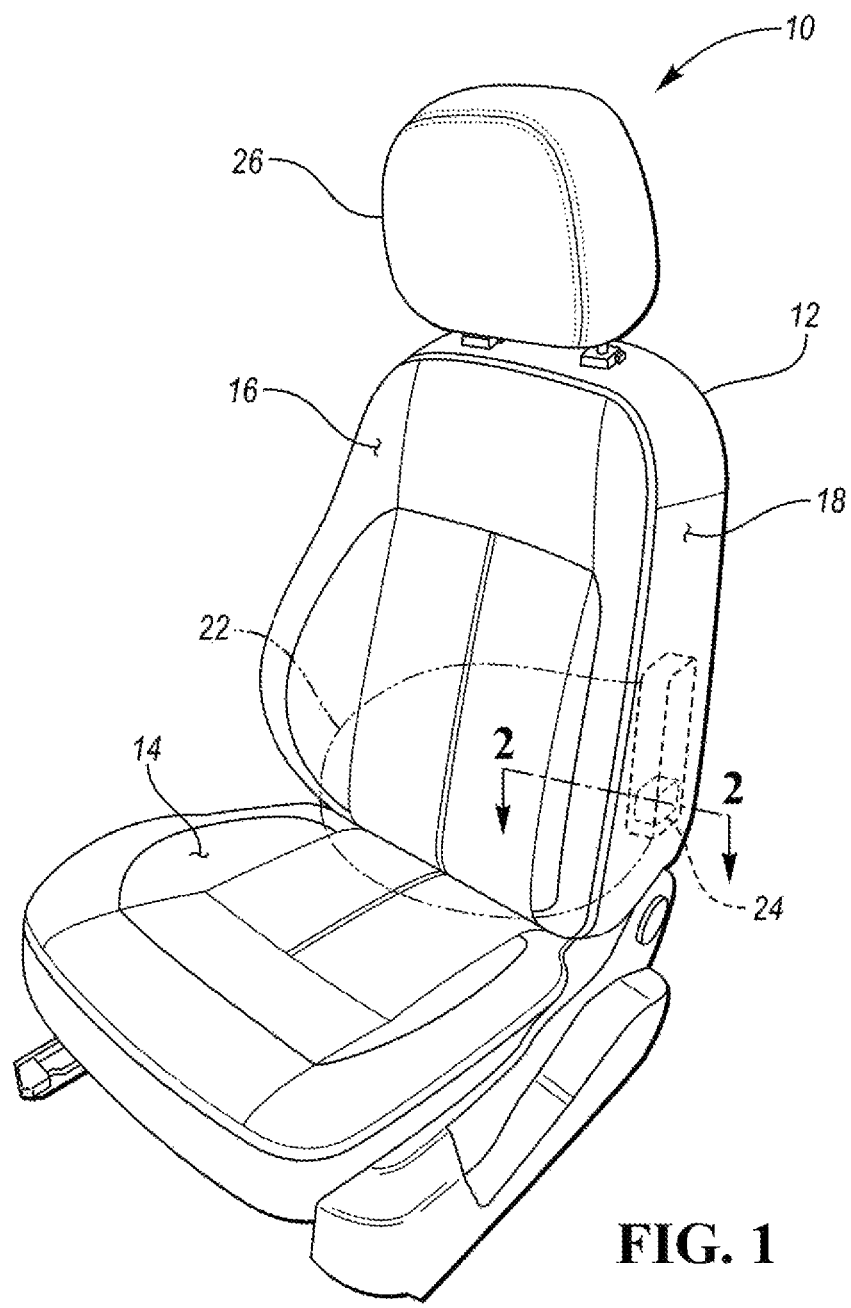
FIG. 1 is a perspective view of a vehicle seat.

Referring now to FIG. 1, a vehicle seat, indicated generally at 10, is provided. The seat 10 generally includes a seat back 12 and a seat cushion or bottom 14. The lateral sides of the seat back 12 may define an inboard bolster 16 and an outboard bolster 18. An airbag module or assembly 20, shown schematically in FIG. 1, may be mounted in the outboard bolster 18 of the seat 10. The airbag module 20 may include an airbag 22 which is deployable (e.g., inflatable by actuation of an inflator 24) between a folded position and a deployed position, as indicated by phantom lines 22 in FIG. 1. When in the folded position, the airbag 22 can be in any folded state for reducing its storage size. When in the deployed position, the airbag 22 may be inflated and generally located laterally of the occupant of the seat 10. The seat 10 may also include a headrest 26.

Figure 2:
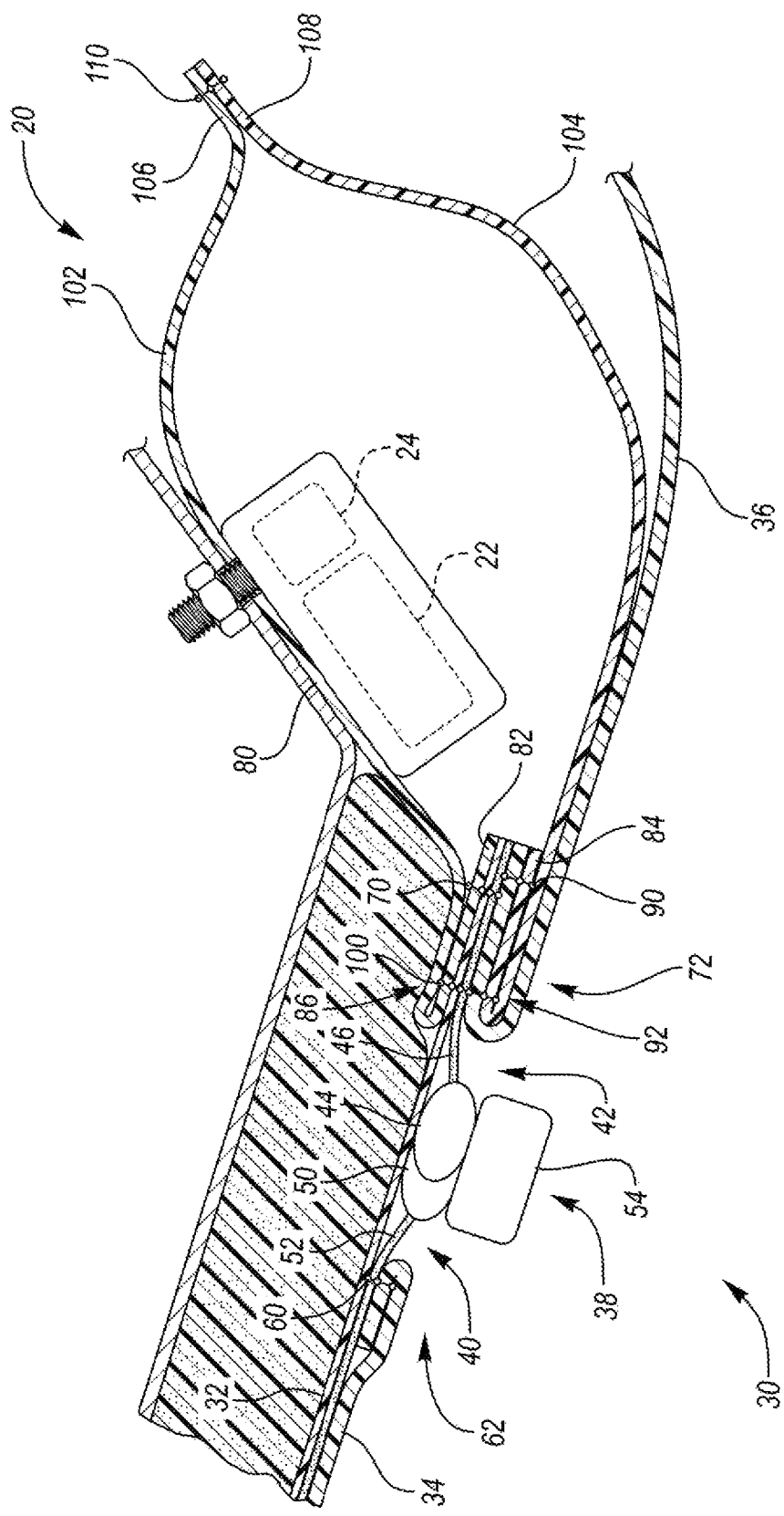
FIG. 2 is an enlarged schematic cross-section of the vehicle seat taken along lines 2-2 of FIG. 1.

Referring to FIG. 2, a seating structure 30 for a portion of the vehicle seat 10 may be provided. The seating structure 30 may correspond to one or more of the seat back 12, the seat cushion 14, and the headrest 26 of FIG. 1. The seating structure 30 may include a first base cover which may be a central base cover 32, a removable trim cover 34, a second base cover which may be a side base cover 36, a fastener assembly 38, and the airbag assembly 20. The central base cover 32 may be a fabric base cover, and may extend over a central part of a frame of the seating structure 30. The side base cover 36 may also be a fabric base cover. The side base cover 36 may be secured to the central base cover 32 and may extend along a side of the frame of the seating structure 30.

The removable trim cover 34 may extend over at least a portion of the central base cover 32. The removable trim cover 34 may be formed of the same material as the central base cover 32, or may be formed of a different material than the central base cover 32. In this way, the removable trim cover 34 may have a stiffness, texture, breathability, or other feature that is different than that of the central base cover 32. Furthermore, the removable trim cover 34 may have a different aesthetic appearance than the central base cover 32.

The fastener assembly 38 may be a zipper assembly that may include a first fastener interface 40 and a second fastener interface 42 that interfaces (e.g., is connected to or disposed in engagement with) the first fastener interface 40. At least a portion of the first fastener interface 40 may extend between the central base cover 32 and the removable trim cover 34. In this way, a first side of the first fastener interface may face the central base cover 32, and a second side opposite the first side may face the removable trim cover 34. At least a portion of the second fastener interface 42 may extend between the central base cover 32 and the side base cover 36. In this way, a first side of the first fastener interface may face the central base cover 32, and a second side opposite the first side may face the side base cover 36.

The first fastener interface 40 may include a first set of teeth 44 that may be secured to a first fabric tape 46. The second fastener interface 42 may include a second set of teeth 50 that may be secured to a second fabric tape 52. The zipper assembly may also include a slider assembly 54 that may include a slider and a pull tab. The slider assembly 54 may be movable along the first and second sets of teeth 44, 50 to selectively engage and disengage the first and second sets of teeth 44, 50.

In still another approach, the fastener assembly 38 may be another type of fastener assembly that may include, for example, a hook-and-loop interface, and snap-fit interface, or other suitable fastener interface.

In at least one approach, the fastener assembly 38 may be a perimetric fastener (e.g., a perimetric zipper) that extends along at least one of edge of the removable trim cover 34. For example, the perimetric fastener may extend along an entire perimeter of the removable trim cover 34. As discussed in greater detail elsewhere herein, the fastener assembly 38 may permit the removable trim cover 34 to be selectively removed from the seating structure 30 (e.g., from the side base cover 36).

The first fastener interface 40 may be secured to the removable trim cover 34. For example, the first fabric tape 46 may be secured to the removable trim cover 34 at a first seam 60. The first seam 60 may be in the form of one or more stiches, adhesive, mechanical fasteners, etc. The first seam 60 may be disposed at a fold region 62 of the removable trim cover 34, which may define at least two parallel (or substantially parallel) layers of the removable trim cover 34. At the fold region 62, the first seam 60 may extend through one or more layers of the removable trim cover 34. For example, the first seam 60 may extend through only the layer of the removable trim cover 34 that is disposed adjacent to the first fastener interface 40. In this way, the first seam 60 may be hidden from view in the assembled configuration.

The second fastener interface 42 may be secured to the central base cover 32. For example, the second fabric tape 52 may be secured to the central base cover 32 at a second seam 70. The second seam 70 may be in the form of one or more stiches, adhesive, mechanical fasteners, etc. In at least one approach, the second seam 70 interfaces (e.g., is disposed in engagement with) a fold region 72 of the side base cover 36. The fold region 72 may define at least two parallel (or substantially parallel) layers of the side base cover 36. In this way, the second seam 70 may be hidden from view in the assembled configuration.

The airbag assembly 20 may further include an airbag chute 80. The airbag chute 80 may receive the inflatable airbag 22 and the inflator 24. The airbag chute 80 may be adapted to direct the airbag 22 during deployment of the airbag 22.

The airbag chute 80 may have a first end region 82 and a second end region 84. In the approach shown in FIG. 2, the central base cover 32, the second fastener interface 42 (e.g., at the second fabric tape 52), and the side base cover 36 may extend between the first and second end regions 82, 84. The second seam 70 may extend through the first end region 82. In this way, the second seam 70 may secure the first end region 82 to the second fastener interface 42 and the central base cover 32. For example, the second seam 70 may extend through a fold region 86 of the first end region 82, which may define at least two parallel (or substantially parallel) layers of the first end region 82. At the fold region 82, the second seam 70 may extend through one or more layers of the first end region 82. For example, the second seam 70 may extend through only the layer of the first end region 82 that is disposed adjacent to the central base cover 32. In this way, the first seam 60 may be hidden from view in the assembled configuration.

The second end region 84 may be secured to the side base cover 36. For example, the second end region 84 may be secured to the side base cover 36 at a third seam 90. The third seam 90 may be in the form of one or more stiches, adhesive, mechanical fasteners, etc. In at least one approach, the third seam 90 may be disposed at the fold region 72 of the side base cover 36, as well as at a fold region 92 of the second end region 84, which may define at least two parallel (or substantially parallel) layers of the second end region 84. At the fold region 92, the third seam 90 may extend through one or more layers of the second end region 84. For example, the third seam 90 may extend through only the layer of the second end region 84 that is disposed adjacent to the layer of the side base cover 36 that interfaces the second fastener interface 42 (e.g., at the second fabric tape 52). In this way, the third seam 90 may be hidden from view in the assembled configuration.

The seating structure 30 may be provided with a fourth seam, that may be an airbag seam 100. The airbag seam 100 may extend through the first end region 82 (e.g., at the fold region 82), the central base cover 32, the second fastener interface 42 (e.g., at the second fabric tape 52), the side base cover 36 (e.g., at the fold region 72), and the second end region 84 (e.g., at the fold region 92). In this way, the first end region 82 may be secured to the central base cover 32, the second fastener interface 42, the side base cover 36, and the second end region 84.

In at least one approach, the airbag chute 80 may be a unitary airbag chute. In still another approach, the airbag chute 80 may be a multi-piece airbag chute 80. For example, the airbag chute 80 may include a first chute panel 102 and a second chute panel 104. The first chute panel 102 may include the first end region 82 and a third end region 106. The second chute panel 104 may include the second end region 84 and a fourth end region 108. The third end region 106 may be secured to the fourth end region 108 at a chute seam 110.

In the assembled configuration, the removable trim cover 34 may not be secured to the central base cover 32. For example, the seating structure 30 may be free of seams between the removable trim cover 34 and the central base cover. In this way, the removable trim cover 34 may be secured to the side base cover 36 only through the fastener assembly 38 (e.g., which may be a zipper assembly). As such, the removable trim cover 34 may be at least partially secured to the side base cover 36 through the zipper assembly when at least portion of the first and second sets of teeth 44, 50 are engaged. The removable trim cover 34 may not be secured to the side base cover 36 when the first and second sets of teeth 44, 50 are disengaged. In this way, the removable trim cover 34 may be selectively removed from the seat structure 30.

Figure 3:
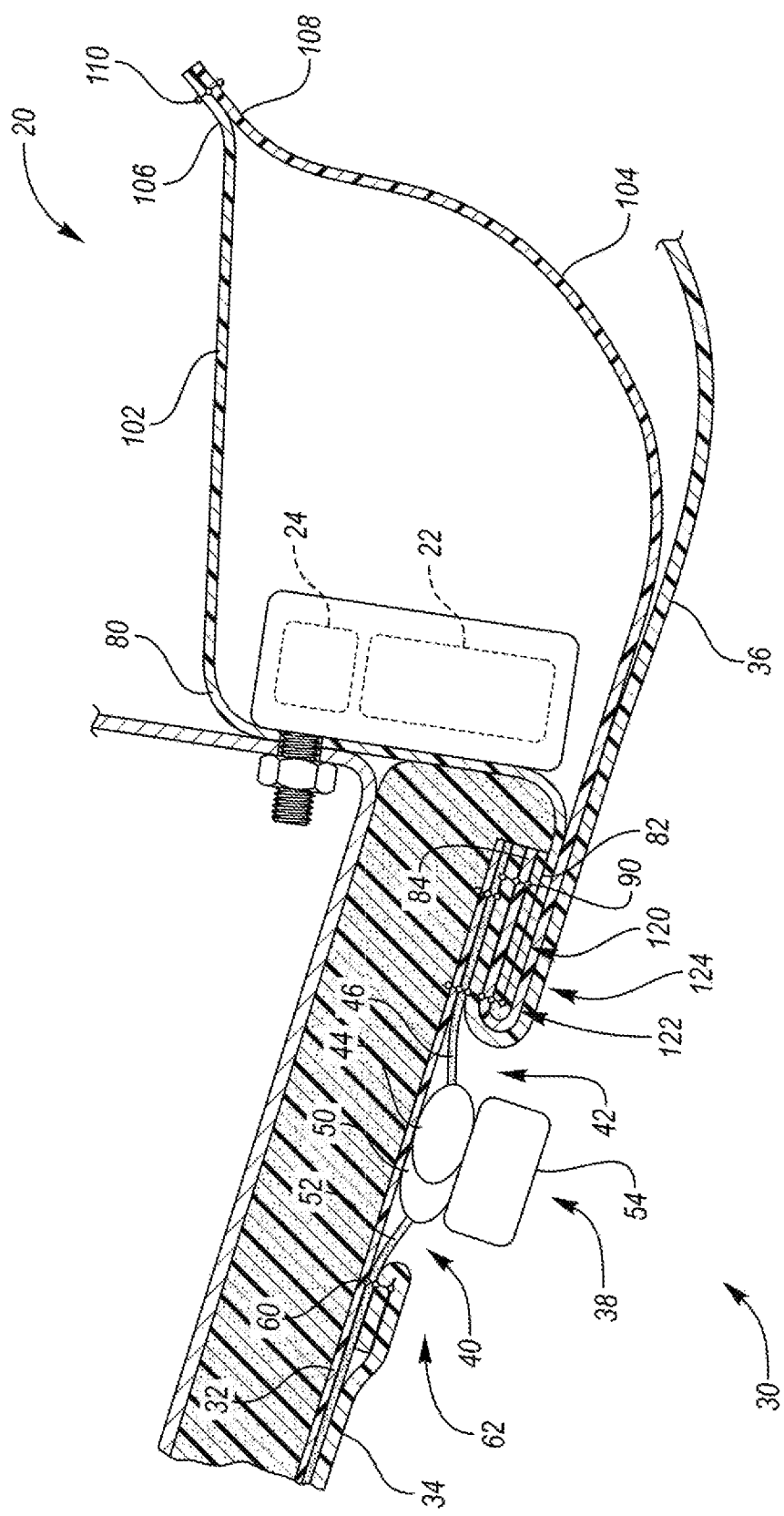
FIG. 3 is an enlarged schematic cross-section of another vehicle seat.
Figure 4:
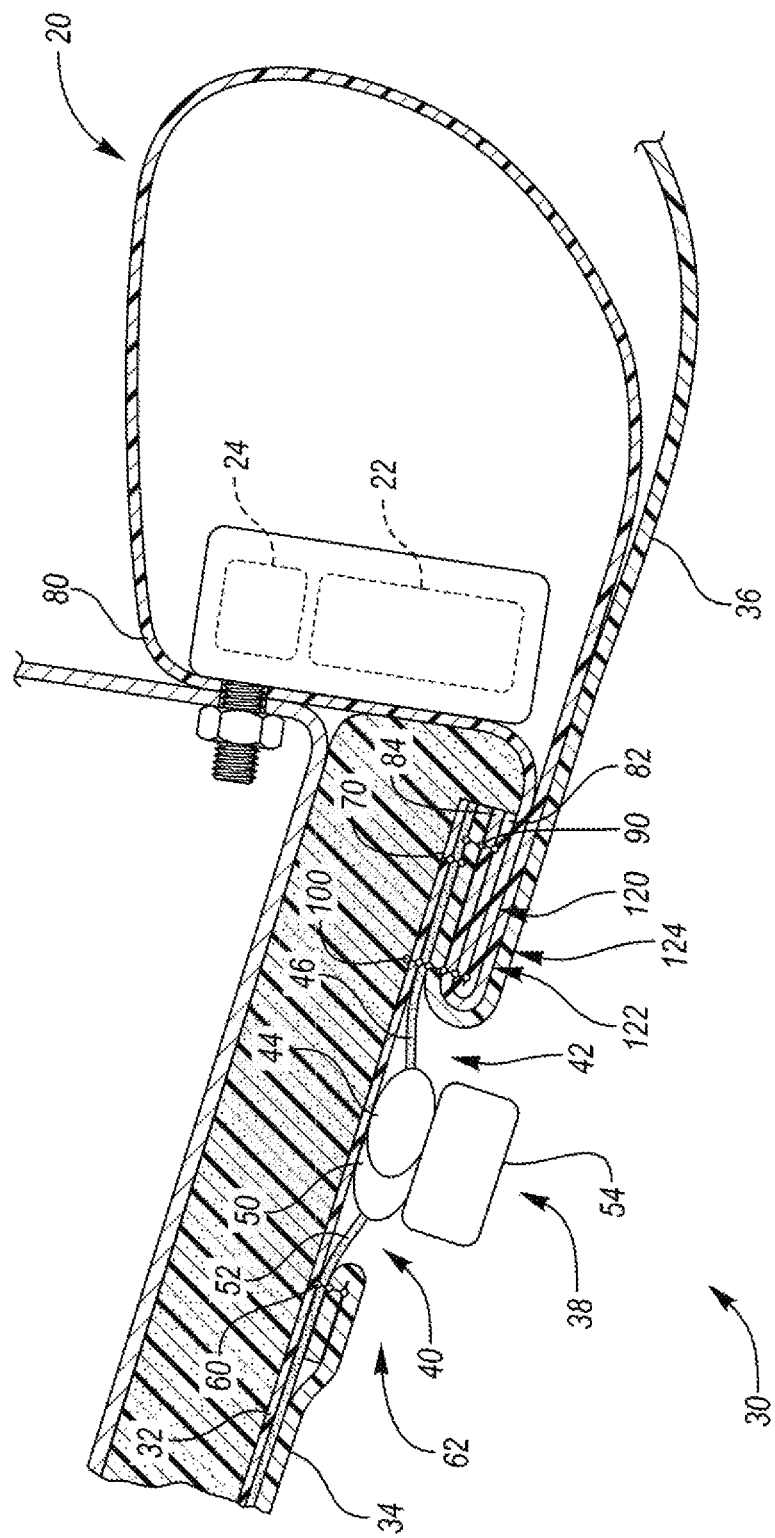
FIG. 4 is an enlarged schematic cross-section of still another vehicle seat.

Referring to FIGS. 3 and 4, alternative approaches are shown. The approach shown in FIG. 4 generally corresponds to the approach shown in FIG. 3, and common reference numbers are used with respect to FIG. 2. FIG. 4, however, depicts a one-piece airbag chute 80, whereas FIG. 3 depicts a multi-piece airbag chute 80. The multi-piece airbag chute 80 of FIG. 3 may correspond to the multi-piece airbag chute 80 of FIG. 2. As such, the multi-piece airbag chute 80 of FIG. 3 may include a first chute panel 102 and a second chute panel 104. The first chute panel 102 may include the first end region 82 and a third end region 106. The second chute panel 104 may include the second end region 84 and a fourth end region 108. The third end region 106 may be secured to the fourth end region 108 at a chute seam 110.

In the approaches of FIGS. 3 and 4, the second end region 84 may be adjacent to the first end region 82. More particularly, the first end region 82 may be disposed adjacent to the second end region 84 at a common side of the central base cover 32. The first end region 82 may be disposed in engagement with the second end region 84. The second end region 84 may be secured to the side base cover 36 at the third seam 90.

In at least one approach, the second end region 84 extends over a first fold 120 of the first end region 82 to define a second fold 122. The side base cover 36 may extend over the second fold 92 to define a third fold 124. The first, second, and third folds 120, 122, 124 may be disposed at a common side of the central base cover 32.

In at least one approach, a trim assembly may be provided. The trim assembly may be provided for a vehicle seat structure that has a removable trim cover 34. The trim assembly may include a central base cover 32 and a side base cover 36 that extends over at least a portion of the central base cover 32. A fastener (which may correspond to the second fastener interface 42) may be provided. The fastener may have an attachment portion (which may correspond to the first fabric tape 46). The attachment portion may extend between the central base cover 32 and the side base cover 36, and may be secured to at least one of the central base cover 32 and the side base cover 36 (e.g., at seam 70).

The trim assembly may also include an airbag assembly 20 that may include an inflatable airbag 22 and an inflator 24 disposed within an airbag chute 80. The airbag chute 80 may have a first end region 82 and a second end region 84. The second end region 84 may be disposed adjacent to, and may be secured to, the side base cover 36. An airbag seam (which may correspond to seam 100) may extend through the first end region 82, the central base cover 32, the attachment portion, the side base cover 36, and the second end region 84.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined at further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle seat comprising:
   a central base cover;
   a removable trim cover extending over at least a portion of the central base cover;
   a side base cover secured to the central base cover;
   a fastener assembly having a first fastener interface secured to the removable trim cover and a second fastener interface secured to the side base cover and connected to the first fastener interface; and
   an airbag assembly including an inflatable airbag and an inflator disposed within an airbag chute, the airbag chute having a first end region and a second end region, wherein the first end region is secured to the central base cover, the second fastener interface, the side base cover, and the second end region.

2. The vehicle seat of claim 1 wherein a common seam secures the first end region to the central base cover, the second fastener interface, the side base cover, and the second end region.

3. The vehicle seat of claim 1 wherein the second fastener interface extends between the central base cover and the side base cover.

4. The vehicle seat of claim 1 wherein the removable trim cover is not secured to the central base cover at a seam.

5. The vehicle seat of claim 1 wherein the central base cover, the second fastener interface, and the side base cover extend between the first and second end regions.

6. The vehicle seat of claim 1 wherein the first end region is disposed adjacent to the second end region at a common side of the central base cover.

7. The vehicle seat of claim 6 wherein the first end region defines a first fold, wherein the second end region extends over the first fold to define a second fold, and wherein the side base cover extends over the second fold to define a third fold.

8. The vehicle seat of claim 1 wherein the first fastener interface is secured to the removable trim cover at a first seam, and wherein the second fastener interface is secured to the central base cover at a second seam.

9. The vehicle seat of claim 8 wherein the second seam extends through the first end region to secure the first end region to the second fastener interface and the central base cover, and wherein the second end region is secured to the side base cover at a third seam.

10. The vehicle seat of claim 1 wherein the airbag chute includes a first chute panel that includes the first end region and a third end region, and a second chute panel that includes the second end region and a fourth end region, and wherein the third end region is secured to the fourth end region at a chute seam.

11. The vehicle seat of claim 1 wherein the fastener assembly is a zipper assembly, wherein the first fastener interface has a first set of teeth secured to a first fabric tape and the second fastener interface has a second set of teeth secured to a second fabric tape, and wherein the zipper assembly includes a slider movable along the first and second sets of teeth to selectively engage and disengage the first and second sets of teeth.

12. The vehicle seat of claim 11 wherein the zipper assembly is a perimetric zipper that extends along at least one of edge of the removable trim cover.

13. The vehicle seat of claim 11 wherein the removable trim cover is at least partially secured to the side base cover through the zipper assembly when at least portion of the first and second sets of teeth are engaged, and wherein the removable trim cover is not secured to the side base cover when the first and second sets of teeth are disengaged.

14. The vehicle seat of claim 1 wherein the portion is a seat back of the vehicle seat.

15. The vehicle seat of claim 1 wherein the portion is a seat bottom of the vehicle seat.

16. A trim assembly for a vehicle seat structure having an airbag assembly, comprising:
   a central base cover;
   a side base cover extending over at least a portion of the central base cover;
   a fastener having an attachment portion that extends between the central base cover and the side base cover and is secured to at least one of the central base cover and the side base cover; and
   an airbag chute for receiving the airbag assembly, the airbag chute having a first end region and a second end region that is secured to the side base cover, wherein an airbag seam extends through the first end region, the central base cover, the attachment portion, the side base cover, and the second end region.

17. The trim assembly of claim 16 wherein the central base cover, the attachment portion, and the side base cover extend between the first and second end regions.

18. The trim assembly of claim 16 wherein the first end region defines a first fold, wherein the second end region extends over the first fold to define a second fold, wherein the side base cover extends over the second fold to define a third fold, and wherein the first, second, and third folds are disposed at a common side of the central base cover.

19. The trim assembly of claim 16 further comprising a removable trim cover having an opposing fastener, and wherein the fastener and the opposing fastener are removably engaged to secure the removable trim cover to the trim assembly.

20. A vehicle seat comprising:
   a frame;
   an airbag module connected to the frame, the airbag module including an inflatable airbag and an inflator for inflating the airbag; and
   a trim cover assembly that at least partially covers the frame and the airbag module, the trim cover assembly including a first base cover, a removable trim cover extending over at least a portion of the first base cover, a second base cover secured to the first base cover, a fastener assembly having a first fastener interface secured to the removable trim cover and a second fastener interface secured to the first base cover and removably connected to the first fastener interface, and an airbag chute that receives the airbag module, the airbag chute having an end region connected to at least one of the first base cover and the second base cover.

* * * * *